United States Patent
Coste et al.

(10) Patent No.: US 8,069,913 B2
(45) Date of Patent: Dec. 6, 2011

(54) METHOD AND APPARATUS FOR DETECTING ACOUSTIC ACTIVITY IN A SUBSURFACE FORMATION

(75) Inventors: Emmanuel Coste, Oslo (NO); Brian W. Cho, Yokohama (JP); Paolo Primiero, Al-Khobar (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/411,395

(22) Filed: Mar. 26, 2009

(65) Prior Publication Data

US 2009/0242205 A1 Oct. 1, 2009

Related U.S. Application Data

(60) Provisional application No. 61/039,776, filed on Mar. 26, 2008.

(51) Int. Cl.
*E21B 47/00* (2006.01)
(52) U.S. Cl. .............. 166/66; 166/381; 166/250.11
(58) Field of Classification Search ............ 166/66, 166/308.1, 381, 250.11
See application file for complete search history.

(56) References Cited

U.S. PATENT DOCUMENTS

| | | | | |
|---|---|---|---|---|
| 5,181,565 | A * | 1/1993 | Czernichow | 166/66 |
| 5,503,225 | A * | 4/1996 | Withers | 166/250.1 |
| 5,860,483 | A * | 1/1999 | Havig | 175/40 |
| 5,892,733 | A * | 4/1999 | Havig | 367/188 |
| 2003/0192689 | A1* | 10/2003 | Moake et al. | 166/250.01 |
| 2003/0226662 | A1* | 12/2003 | Linyaev et al. | 166/250.11 |
| 2004/0065437 | A1* | 4/2004 | Bostick et al. | 166/250.01 |
| 2006/0131014 | A1* | 6/2006 | Huang et al. | 166/250.07 |
| 2006/0207764 | A1* | 9/2006 | Rytlewski | 166/313 |
| 2008/0128127 | A1* | 6/2008 | Kanaya et al. | 166/250.11 |

FOREIGN PATENT DOCUMENTS

| | | |
|---|---|---|
| GB | 2356209 A | 5/2001 |
| WO | 00/16128 | 3/2000 |
| WO | 03/065076 A2 | 8/2003 |

* cited by examiner

*Primary Examiner* — Daniel P Stephenson
(74) *Attorney, Agent, or Firm* — Daryl R. Wright; Jody DeStefanis; Jeff Griffin

(57) ABSTRACT

A method of monitoring acoustic activity in a formation from a wellbore includes positioning a flow manipulation device into the wellbore, the flow manipulation device defining a flow path through which fluid may flow. Fluid is then pumped into the wellbore and through the manipulation device. A sensor disposed near the manipulation device is then coupled to the formation, the formation is fractured with fluid, and acoustic events in the formation are detected with the sensor.

21 Claims, 3 Drawing Sheets

METHOD AND APPARATUS FOR DETECTING ACOUSTIC ACTIVITY IN A SUBSURFACE FORMATION

CROSS-REFERENCE TO RELATED APPLICATION

This application claims the benefit of co-pending U.S. Provisional Application No. 61/039,776, filed on Mar. 26, 2008, the content of which is incorporated herein by reference for all purposes.

FIELD OF THE DISCLOSURE

The present disclosure generally relates to methods and apparatus for exploring subsurface formations. More particularly, the present disclosure relates to methods and apparatus for sensing acoustic activity in subsurface formations.

BACKGROUND OF THE DISCLOSURE

Various types of acoustic sensing are used during hydrocarbon production. Generally speaking, acoustic sensing may be active or passive. Active acoustic sensing applications include vertical seismic profiling and hydrofracture monitoring, or any other application that includes source activation. In hydrofracture monitoring, for example, a fluid may be injected into the formation to stimulate microseismic activity. Passive applications do not use ancillary means to stimulate the well but instead simply monitor acoustic activity created during production, or monitoring. In each sensing application, the acoustic sensors are used to obtain information to help operators better understand the characteristics of the fracture, such as propagation direction, geometry, dip, and other parameters. In active monitoring applications, the information permits adjustment, in real time, of the injection process parameters in case of a mismatch between the planned and actual fracture. The "real-time" expression refers here to enabling a reaction in a time which is fast enough to have an impact on the economics of the fracturing job (for instance stopping the injection in case the fracture is in danger of extending into a water zone).

Many current microseismic fracture monitoring systems employ a wireline seismic array tool deployed in a monitoring well. A monitoring well, however, is not always available or suitable for microseismic monitoring (e.g., if located too far from the injection well). In addition, there is a high cost associated with running a seismic wireline tool in a monitoring well, mainly coming from the preparation of the monitoring well.

Other fracture monitoring systems have been proposed in which the sensors are deployed in the injection well, thereby eliminating the need for a monitoring well. These systems, however, are typically limited to use in applications where tubing is used to convey the fracture fluid.

SUMMARY OF THE DISCLOSURE

According to one embodiment disclosed herein, a method of monitoring acoustic activity in a formation having a wellbore is provided in which a flow manipulation device is positioned into the wellbore, the flow manipulation device defog a chamber and a flow path through which fluid may flow. A sensor unit is positioned in the flow manipulation device chamber such that the sensor unit is separated from the flow path by the flow manipulation device. Finally, acoustic activity is detected in the formation with the sensor unit.

In another embodiment, an apparatus is provided for obtaining acoustic data from a formation having a wellbore formed therein. The apparatus includes a housing sized for insertion into the wellbore, the housing including an exterior wall, an interior wall defining a flow path through which fluid may flow, and a chamber disposed between the exterior and interior walls. A sensor unit is disposed in the housing chamber and responsive to acoustic energy emanating from the formation.

In a further embodiment, a method of monitoring microseismic events in a formation from a wellbore is provided that includes positioning a flow manipulation device into the wellbore, the flow manipulation device defining a flow path through which fluid may flow. Fluid is then pumped into the wellbore and through the manipulation device. A sensor disposed near the manipulation device is then coupled to the formation, the formation is fractured with fluid, and acoustic activity in the formation is detected with the sensor.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are illustrated graphically, diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

So that the above recited features and advantages of the present disclosure can be understood in detail, a more particular description of the disclosure may be had by reference to the embodiments thereof that are illustrated in the accompanied drawings. It is to be noted, however, that the drawings illustrate only typical embodiments of this disclosure and are therefore not to be considered limiting of its scope, for the disclosure may admit to other equally effective embodiments.

An acoustic monitoring system is disclosed which can be deployed in the treatment well, thereby eliminating the need for a monitoring well. The tool may be operated as either a memory tool or as a wireline tool, and is configured to facilitate easy removal from the wellbore.

Figure 1:
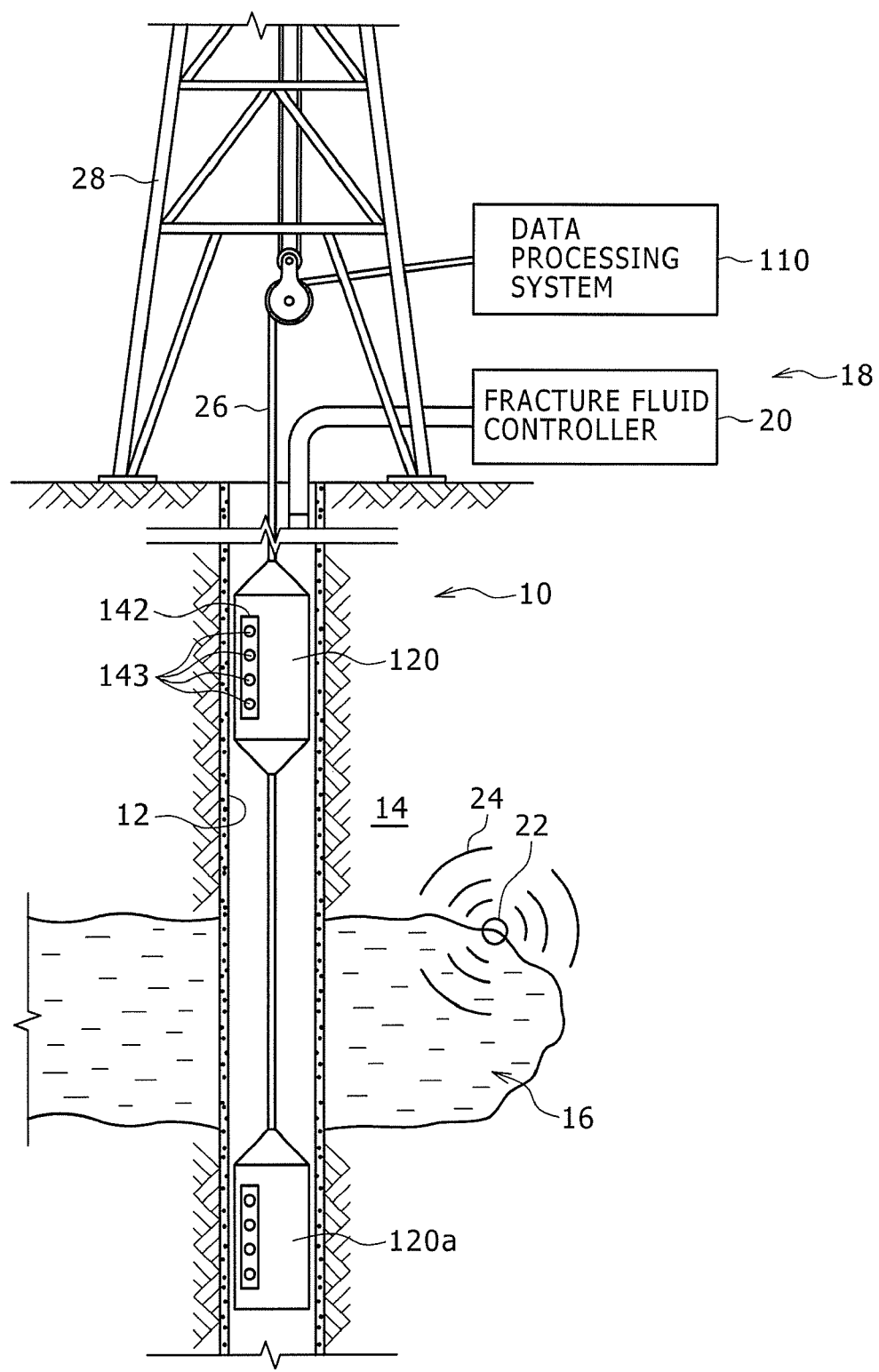
FIG. 1 is a schematic side elevation view, in partial cross-section, of a downhole monitoring tool positioned in a wellbore.
Figure 2:
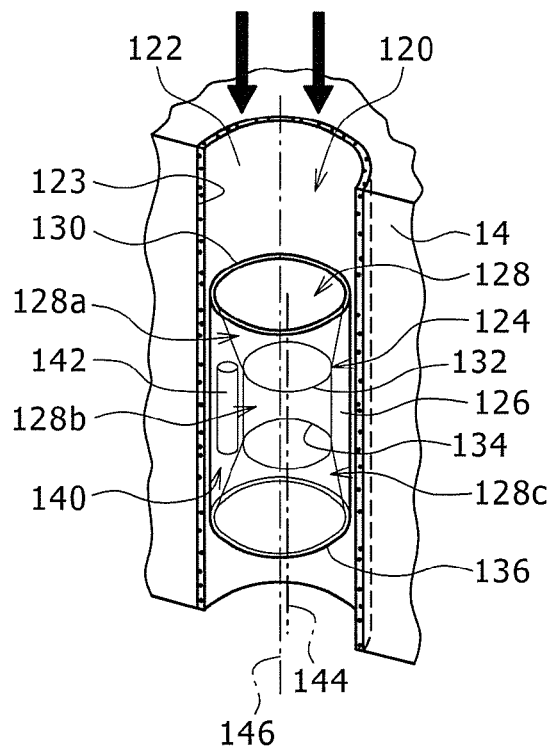
FIG. 2 is a perspective, cross-sectional view of the monitoring tool of FIG. 1.

When the tool is a memory tool, acoustic data may be recorded to a memory device (hard disk or flash), and the tool may powered by a battery. The tool may be deployed using a wireline in which case the tool is coupled to the formation as shown in FIGS. 1 and 2 and as described in more detail below. Alternatively, the tool may be deployed during casing deployment for open hole non-cemented wells, in which case the tool is connected to a casing joint, possibly via a mandrel. In this case, the tool is either connected to the surface recording equipment using a control line deployed behind casing or, in the case of a memory tool, accessed by wireline. In another exemplary embodiment, the tool may be conveyed by coiled tubing and may be attached at a distal end thereof. Regardless of the manner of conveyance, as the tool is retrieved after/during the job, data is analyzed after the fracture of the formation.

Figure 3:
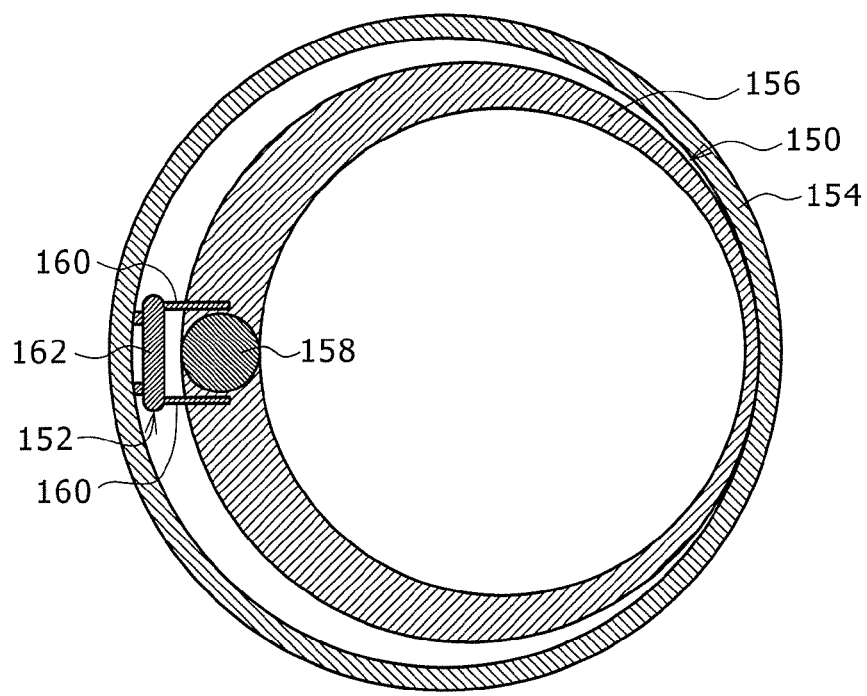
FIG. 3 is a plan, cross-sectional view of an acoustic monitoring tool disposed in a wellbore and having a coupling system.

When the tool is a wireline tool, the tool may be deployed just before injection of fracturing fluid. The wireline is used to provide power to the downhole electronics and motors, and to convey the digital data uphole. The communication link can either be copper or optical telemetry. Acoustic coupling of the sensors to the formation may be ensured by a motor actuated retractable system as shown in FIG. 3, although alternate methods or apparatus may be used.

Furthermore, while one aspect of the disclosure is monitoring microseismicity induced by hydraulic fracturing or reservoir activity, this disclosure also contemplates the field of VSP (Vertical Seismic profiling), where an active source (airgun, dynamite or vibroseis) is used to generate an acoustic signal.

FIG. 1 illustrates a hydraulic fracture monitoring system 10 employed in a wellbore 12. The wellbore 12 traverses a formation 14 having a reservoir or area 16 designated for hydraulic fracture. The wellbore 12 may be lined, such as with mudcake or a casing 122.

A hydraulic fracture system 18 is provided for injecting fracture fluid into the reservoir 16. The hydraulic fracture system 18 may include a source of fracture fluid, a pump operably coupled to the fracture fluid source, and a fracture fluid controller 20 for controlling operation of the pump. The system 18 is operable to inject fluid into the wellbore 12, thereby increasing fluid pressure in the reservoir 16 to stimulate microseismic activity. An exemplary point 22 exhibiting microseismic activity is shown in FIG. 1 propagating seismic waves 24, which may include compression wave ("P-wave") and shear wave ("S-wave") components.

A downhole monitoring tool 120 is disposed in the wellbore 12 for detecting microseismic activity in the formation. In the embodiment illustrated in FIG. 1, the tool 120 is configured as a wireline tool. Accordingly, the tool 120 is attached to a cable 26 deployed from a rig 28. While FIG. 1 shows the rig 28, a wireline arrangement that does not have a rig may be used.

As best shown in FIG. 2, the illustrated tool 120 includes a flow manipulation device in the form of a housing 124. The housing 124 is configured to redirect fluid flow as it travels along the borehole in the vicinity of the tool 120. Accordingly, the housing 124 defines a flow path along which the hydraulic fracture fluid may flow.

In the exemplary embodiment, the flow path is surrounded by the housing 124. As best shown in FIG. 2, the housing 124 has a generally annular shape formed by an exterior wall 126 and an interior wall 128. The exterior and interior walls 126, 128 may be formed of a material having a sufficient hardness to minimize erosion during use, and may be constructed of the same wall. The material may further have acoustic properties which attenuate noise. Exemplary materials suitable for use include steel, stainless steel, titanium alloy, and inconel, however other materials having sufficient hardness and/or noise attenuation may also be used. The walls 126, 128 may be formed entirely of a single material or may have a base layer and an external coating or layer. The exterior wall 126 is cylindrical and may define a substantially uniform diameter. The interior wall 128, however, may include a first transition section 128a, an intermediate section 128b, and a second transition section 128c. The first transition section 128a may have an irregular, frustoconical shape with an outer end 130 having a larger diameter and an inner end 132 having a smaller diameter. The intermediate section 128b may have a cylindrical shape with a substantially uniform diameter approximately equal to the smaller diameter of the first transition section inner end 132. The second transition section 128c may have a frustoconical shape similar to, but inverted from, the first transition section 128a. Accordingly, the second transition section 128c may have an inner end 134 sized at the smaller diameter and an outer end 136 having the larger diameter. The flow path defined by the housing 124, therefore, has a varying cross-sectional area that gradually decreases through the first transition section 128a, is substantially uniform through the intermediate section 128b, and gradually increases through the second transition section 128c.

The flow path may further be configured to minimize the amount of noise generated by fluid flowing therethrough. Accordingly, the housing interior wall 128 may be shaped to promote laminar fluid flow along the path.

The housing 124 further provides an enclosure for protecting a sensor unit 142 from the injection fluid. As best shown in FIG. 2, the housing 124 defines a chamber 140 sized to receive the sensor unit 142. The chamber 140 is formed in the annular space between the exterior wall 126 and the interior wall 128, or may simply be within or on the tool 120. The chamber 140 is widest at a central portion located between the intermediate section 128b of the interior wall and the exterior wall 126. As shown in the illustrated embodiment, a centerline 144 of the intermediate section 128b may be offset from a centerline 146 of the casing 122 to maximize the width of the chamber central portion.

The sensor unit 142 is disposed in the housing chamber 140 and is configured to detect microseismic activity in the formation. The sensor unit 142 may include one or more sensors 143 (FIG. 1) for detecting seismic, acoustic, or related energy. Exemplary sensors include hydrophones, geophones (including optical), MEMS, pressure/temperature sensors, or other types of sensors, or combinations thereof.

A data processing system 110 is operatively coupled to the sensor unit 142 by the cable 26 (FIG. 1). The data processing system 110 is configured to receive, store, and/or process signals from the sensors 143. Accordingly, the data processing system 110 may include control, communication, and processing circuitry, a power supply, a processor, a RAM, a recorder, and the like. In certain embodiments, the data processing system 110 may omit one or more of the foregoing components. For example, if an optical geophone is used, it may be coupled to the data processing system 110 using optical fiber, in which case electrical power is not needed to transmit the signals. The processor may be a suitably programmed general purpose computer system, a special purpose digital or analog computer, or other device.

Based on the acoustic signals generated by the sensors 143, the data processing system 110 may run programs containing instructions that, when executed, perform various routines for processing the signals. These routines may be fully automated and capable of continuous operation in time for monitoring, detecting, and locating microseismic events. An operator may receive results from the process routines in real time, such as on a display monitor, and may adjust hydraulic fracture parameters such as pumping pressure, stimulation fluid, and proppant concentrations to optimize wellbore stimulation based on the displayed information.

In operation, an acoustic monitoring tool 120 may be inserted into a wellbore using one of the many known methods. A source may then be activated to generate acoustic and/or seismic energy that is received by the tool sensor unit 142. In the illustrated embodiment, the energy source is microseismic activity in the formation induced by hydraulic fluid pressure in the reservoir. Alternatively, the energy source may be located at the surface, in the wellbore, or at an adjacent monitoring wellbore. During fracture fluid injection, the tool 120 directs the fluid flow away from the sensor unit 142, thereby enabling the sensor unit 142 to be disposed in the same wellbore as the injection fluid. The annular shape of the housing 124 shown in FIG. 2 prevents, or at least minimizes, flow restriction during the injection process to facilitate fracture fluid injection. The energy sensed by the sensor unit 142 is converted into a signal representing data, such as seismic data. The data is communicated to the data processing system 110, in which one or more stored programs will process the data to derive useful information regarding the location, geometry, or other characteristics of the microfractures in the formation.

While the foregoing describes a single acoustic monitoring tool 120 in the wellbore 12, multiple tools may be used. Furthermore, additional downhole tools other than microseismic monitoring tools may be deployed in the wellbore 12.

An optional coupling system may be provided for reducing unwanted noise during acoustic sensing. The coupling system may be used to place the sensor unit nearer to or in direct contact with the casing, thereby to improve seismic/acoustic sensing. Additionally, the coupling system may better secure the tool in place, thereby to damp unwanted vibrations or other sources of undesirable noise. Without a coupling system, the tool may tend to move or vibrate during fluid flow, thereby generating noise. Various types of coupling systems may be used, either individually or in combination, to minimize or eliminate unwanted noise.

FIG. 3 illustrates an acoustic monitoring tool 150 including a piston-type coupling system 152. The tool 150 is disposed in a casing 154, and includes a housing 156 in which a sensing unit 158 is disposed. The coupling system 152 includes arms 160 coupled to the housing 156 and a contact pad 162 coupled to the arms 160. The arms 160 are radially extendable between a retracted position, in which the contact pad 162 is positioned closer to the housing 156, and an extended position, in which the contact pad 162 is farther from the housing 156 to engage the casing 154 (as shown in FIG. 3). Acoustic coupling between the sensor unit 158 and the microseismic energy source is provided when the contact pad 162 engages the formation or casing wall, as the sensor is in direct contact with, as opposed to off-set from, the formation/casing wall.

Additionally or alternatively, the sensor unit and/or housing may be suspended or may include a dampening mechanism to absorb and/or remove unwanted noise. In particular, the sensor unit may be connected to the tool using a mechanical filter, such that the sensor unit is isolated from the housing. The tool also may be connected to the formation/casing using a similar spring dashpot system. Alternatively, the sensor unit may be coupled to the tool by a magnetic system.

Figure 4:
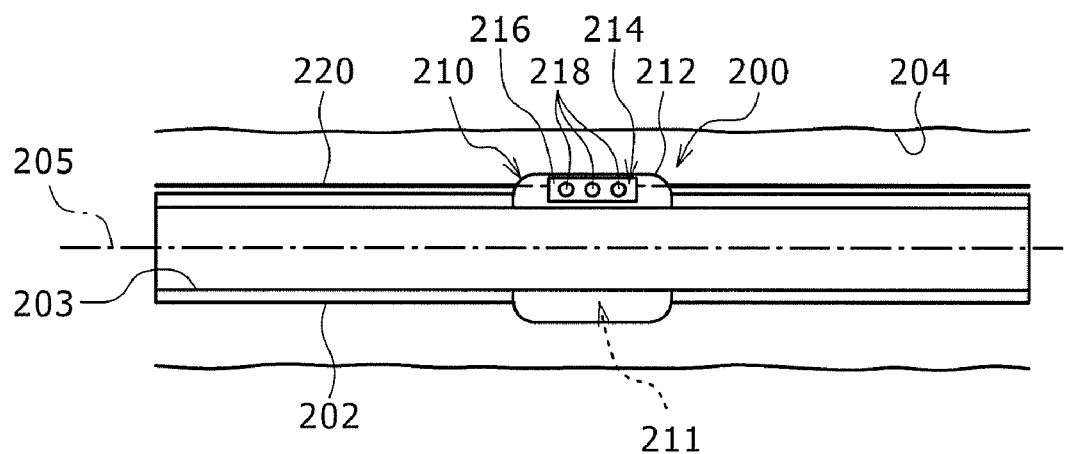
FIG. 4 is side elevation view in cross-section of an acoustic monitoring tool having a packer in a retracted position.
Figure 5:
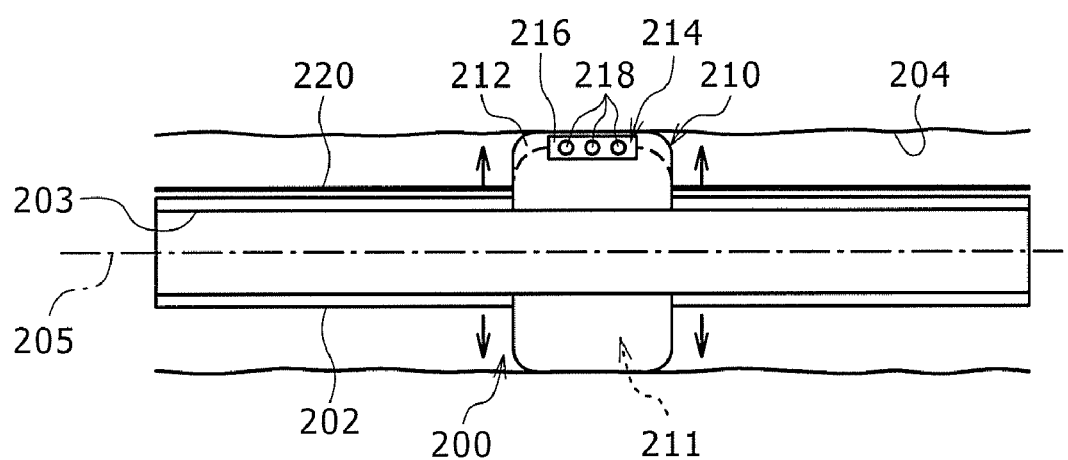
FIG. 5 is a side elevation view in cross-section of the acoustic monitoring tool of FIG. 4, with the packer in the expanded position.

FIGS. 4 and 5 illustrate a further embodiment of an acoustic monitoring tool 200. The tool 200 may include a housing 202 similar to that of the embodiment shown in FIGS. 1-3, but it also includes a packer 210 which may be used to seal between the wellbore and the tool 200 to force fluid through the tool 200. The housing 202 may include an inner wall 203 defining a flow path 205. The housing 202 is disposed in a wellbore 204 formed in a formation.

The packer 210 may be similar to conventional packers that are well-known in the art, except as discussed below. Accordingly, the packer 210 may have an annular shape extending around a periphery of the housing 202. In the illustrated embodiment, the packer 210 defines an annular chamber 211. The packer 210 may also have a contact surface 212. The packer 210 may be formed of a resilient material that permits movement between a retracted position and an extended position. In the retracted position as best shown in FIG. 4, the contact surface 212 is spaced from the surface of the wellbore 204. In the extended position as best shown in FIG. 5, the contact surface 212 engages the surface of the wellbore 204. The packer 210 may be moved between retracted and expanded positions using any known type of packer actuator, such as controlling pressurized fluid flow into the packer interior chamber 211. A controller may be provided for controlling actuation of the packer 210.

The tool 200 further includes a sensor unit 214 for detecting acoustic and/or seismic energy. The illustrated sensor unit 214 is disposed in the packer interior chamber 211 and includes a chassis 216 holding one or more sensors 218. Accordingly, the packer 210 provides a protective enclosure for the sensor unit 214. As noted above, the one or more sensors 218 may include sensors for detecting seismic, acoustic, or related energy. Exemplary sensors include hydrophones, geophones (including optical), MWMS, pressure/temperature sensors, or other types of sensors, or a combination thereof.

The tool 200 may further include means for communicating sensed data to a remote location, such as to the surface. In the illustrated embodiment, a telemetry line 220 is operatively coupled to the sensor unit 214, however other communication means may be used. Additionally or alternatively, the tool 200 may include storage media for storing the sensor data.

In operation, the packer 210 may be actuated to acoustically couple the sensor unit 214 to the formation. When the packer 210 is placed in the expanded position, such as by increasing fluid pressure in the chamber 211, the contact surface 212 will engage the wellbore wall, as shown in FIG. 5, thereby placing the sensor unit 214 in close proximity to the formation. Multiple tools 200 may be spaced along the housing 202 to form a seismic array.

While the foregoing describes monitoring at a specific depth in the wellbore, it will be appreciated that the various tool embodiments disclosed herein may be quickly and easily repositioned to different wellbore depths to obtain acoustic information related to multiple target zones in the formation.

Moreover, inventive aspects lie in less than all features of a single disclosed embodiment. Thus, the claims following the Detailed Description are hereby expressly incorporated into this Detailed Description, with each claim standing on its own as a separate embodiment. The embodiments and aspects were chosen and described in order to best explain the principles of the invention and its practical application. The preceding description is intended to enable others skilled in the art to best utilize the principles in various embodiments and aspects and with various modifications as are suited to the particular use contemplated. It is intended that the scope of the invention be defined by the following claims.

The invention claimed is:
1. A method of monitoring acoustic activity in a formation having a wellbore, the method comprising:

positioning a flow manipulation device into the wellbore, the flow manipulation device defining a chamber and a flow path through which fluid may flow;

positioning a sensor unit in the flow manipulation device chamber such that the sensor unit is separated from the flow path by the flow manipulation device;

acoustically coupling the sensor unit to the formation via a radially extending coupling device; and detecting acoustic activity in the formation with the sensor unit.

2. The method of claim 1, further comprising injecting a fluid into the wellbore.

3. The method of claim 2, in which detecting acoustic activity and injecting fluid into the formation occur simultaneously.

4. The method of claim 2, in which a majority of the fluid injected into the wellbore traverses the flow path.

5. The method of claim 1, further comprising sealing an annular area between a wellbore wall and the flow manipulation device wall.

6. The method of claim 1, in which the flow manipulation device comprises a housing having an exterior wall and an interior wall, and the chamber is disposed between the interior and exterior walls.

7. The method of claim 6, in which the housing interior wall is configured to minimize acoustic noise from fluid flowing therethrough.

8. The method of claim 1, in which the sensor unit comprises multiple acoustic sensors.

9. The method of claim 1, further comprising coupling the sensor unit to the wellbore.

10. The method of claim 9, further comprising isolating the sensor unit from vibrations in the housing.

11. The method of claim 1, further comprising:

positioning a second flow manipulation device into the wellbore, the second flow manipulation device defining a second chamber and a second flow path through which fluid may flow;

positioning a second sensor unit in the second flow manipulation device chamber such that the second sensor unit is separated from the second flow path by the second flow manipulation device; and detecting acoustic activity in the formation with the second sensor unit.

12. Apparatus for obtaining acoustic data from a formation having a wellbore formed therein, comprising:

a housing sized for insertion into the wellbore, the housing including an exterior wall, an interior wall defining a flow path through which fluid may flow, and a chamber disposed between the exterior and interior walls;

a sensor unit disposed in the housing chamber and responsive to acoustic activity emanating from the formation; and a coupling device for acoustically coupling the sensor unit to the wellbore or casing via radial extension.

13. The apparatus of claim 12, in which the housing inner wall comprises a first transition section having a substantially frustoconical shape, an intermediate section having a substantially cylindrical shape, and a second transition section having a substantially frustoconical shape.

14. The apparatus of claim 12, in which the sensor unit is acoustically decoupled from the housing.

15. The apparatus of claim 12, in which the coupling system includes a packer.

16. The apparatus of claim 12, further including an outer seal disposed around the housing outer wall and configured to seal between the housing outer wall and the wellbore.

17. A method of monitoring microseismic events in a formation from a wellbore, comprising:

positioning a flow manipulation device into the wellbore, the flow manipulation device defining a flow path through which fluid may flow;

pumping fluid into the wellbore and through the manipulation device;

acoustically coupling a sensor, disposed near the manipulation device and near to an interior wall of the casing, to the formation via a coupling device through radial extension;

fracturing the formation with the fluid; and detecting acoustic activity in the formation with the sensor.

18. The method of claim 17, in which detecting acoustic activity and pumping fluid occur simultaneously.

19. The method of claim 17, in which the housing interior wall completely surrounds the flow path.

20. The method of claim 19, in which the housing interior wall is configured to minimize acoustic noise from fluid flowing therethrough.

21. The method of claim 17, further comprising isolating the sensor unit from vibrations in the housing.

* * * * *